4804X
W. BEACH.
Plow.
Patented June 27, 1827.
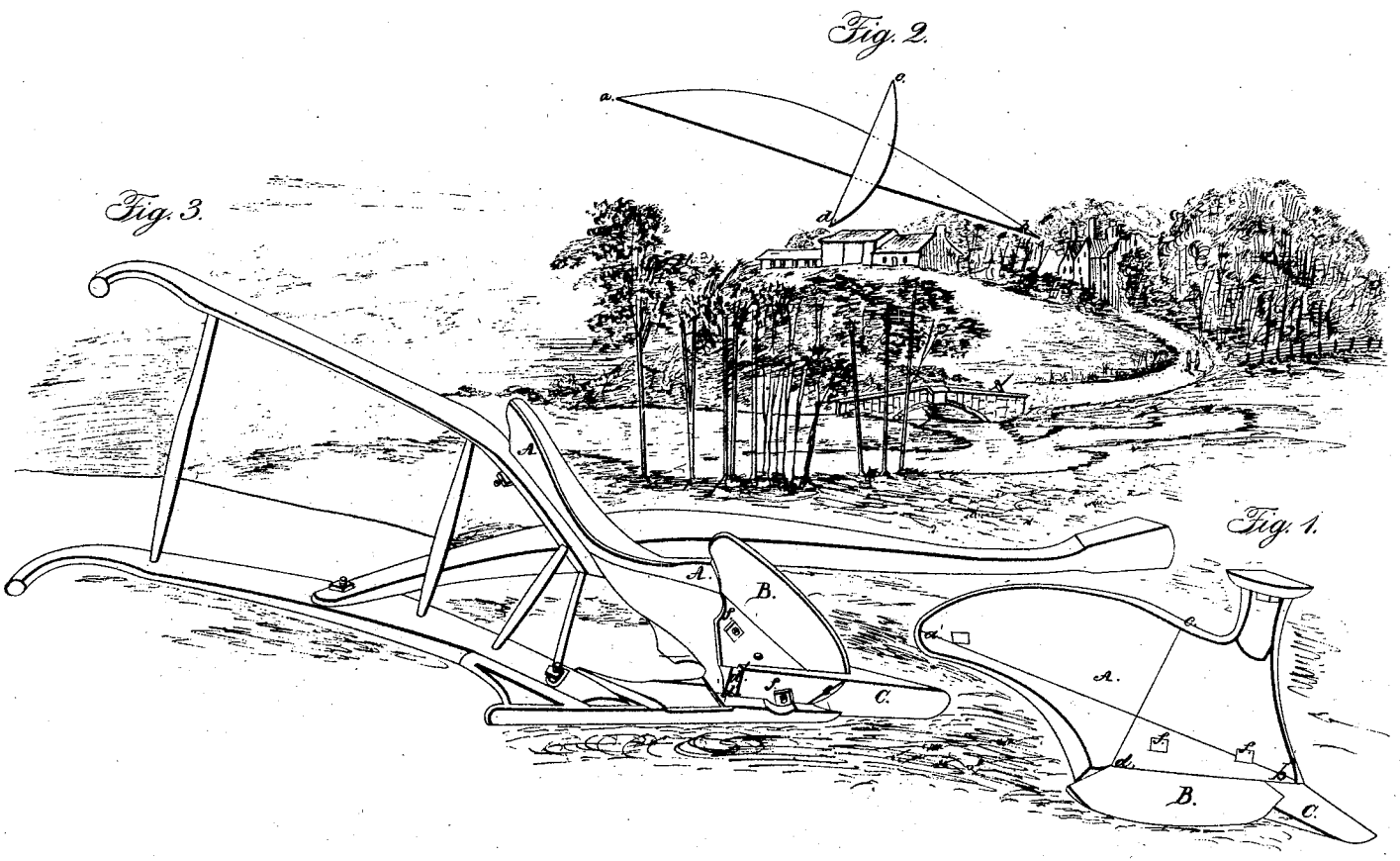
AN. PHOTO-LITHO. CO. N.Y. (OSBORNE'S PROCESS.)

4804X

UNITED STATES PATENT OFFICE.

WILLIAM BEACH, OF PHILADELPHIA, PENNSYLVANIA.

IMPROVEMENT IN PLOWS.

Specification forming part of Letters Patent dated June 27, 1827.

*To all whom it may concern:*

Be it known that I, WILLIAM BEACH, of Philadelphia, in the county of Philadelphia and State of Pennsylvania, have invented Improvements in Plows, of which the following is a specification.

The improvements consist in the three following particulars: first, in the form of the mold-board; second, in the form or shape of a detached self-sharpening point and share and the manner of securing them to the plow. The third is a share and point connected together in such manner that it may be reversed and used on either a right or left handed plow.

The difference in the mold-boards from plows heretofore used is in the following particulars: The faces of the mold-boards in general use are made in such shape that, viewed lengthwise or horizontally from front to back, they exhibit nearly a straight line, excepting the twist, forming what may be termed a "straight" twist.

The improvements consist in forming the face of a mold-board concave both horizontally and vertically, which will make the breast of the plow dishing, so that if laid in a proper position the face of the mold-board will hold or contain water.

The self-sharpening point and share above mentioned, when made separate or in two distinct pieces, may be made as follows: The share should be made in such shape and form that it will extend in under the mold-board, to which it will be secured by one or two bolts in the customary manner. The two ends or inner angles of the share will be of the same shape, form, and dimensions, and likewise the upper and under side will be the same, so that it may be reversed to give it the advantage of the self-sharpening principle. The front or forward end of the share will be secured in its proper place by the point, which will be made in such shape, with a corner groove or rabbet formed in the corner thereof from the front corner of the share to the back end of said point, that the top of the share and point will be about even or smooth, and the bottom part of the point under the rabbet will come under the edge or side of the share next the point, the share being of about half the thickness of the point. The right and left hand edge or side of the point will be made the same, so that it may be reversed, except that the corner groove or rabbet on one edge or side will be formed on the top or upper corner, and on the other on the bottom or lower corner. The rabbet on the edge next the landside will be formed in the lower corner, and the upper corner, projecting edge, or tongue will be placed in a groove formed for that purpose in the inside of the landside. There will be a bolt passed down through the point of the mold-board and the point, near the back end of said point, which, with the aforesaid groove in the inside of the landside, will secure the point of the plow.

The connected point and share before mentioned will be made similar in shape to the above-described when placed together, except that the two sides—that is, the top and bottom—will be alike, the point being no thicker than the share, except on the landside directly in front of the point of the mold-board. There will be a groove formed in the inside of the landside, as above mentioned, to receive the edge of the point next the landside. The point and share will be secured to the mold-board with bolts in the usual manner. The connected point and share will be so made that it may be reversed and used either on a right or left handed plow and shifted from one to the other, as occasion may require, which will give the advantage of the self-sharpening principle, as it will be placed one side upon a right and the other on a left handed plow, one side being made to fit a right and the other a left handed plow.

The points and shares, whether connected or detached, may be made of either cast or wrought iron.

WILLIAM BEACH.

Witnesses:
D. B. LEE,
T. J. BRYANT.